I. T. Baker,
Mole Plow.
No. 113,722.   Patented Apr. 18, 1871.

Witnesses:
A. Bennerisendorf
Wm. H. C. Smith.

Inventor:
I. T. Baker.
Per Munn & Co
Attorneys.

UNITED STATES PATENT OFFICE.

ISAAC T. BAKER, OF GRATIOT, OHIO.

IMPROVEMENT IN TILE-DITCHERS.

Specification forming part of Letters Patent No. 113,722, dated April 18, 1871.

*To all whom it may concern:*

Be it known that I, ISAAC T. BAKER, of Gratiot, in the county of Licking and State of Ohio, have invented a new and useful Improvement in Tile-Ditchers; and I do hereby declare that the following is a full, clear, and exact description thereof, which will enable others skilled in the art to make and use the same, reference being had to the accompanying drawings, forming part of this specification.

This invention relates to a new and useful improvement in machines for cutting ditches for drain-tile; and it consists in a hollow curved bed-plate or trough, provided with a share or cutting-edge and with an adjustable beam, as hereinafter more fully described.

Figure 1:
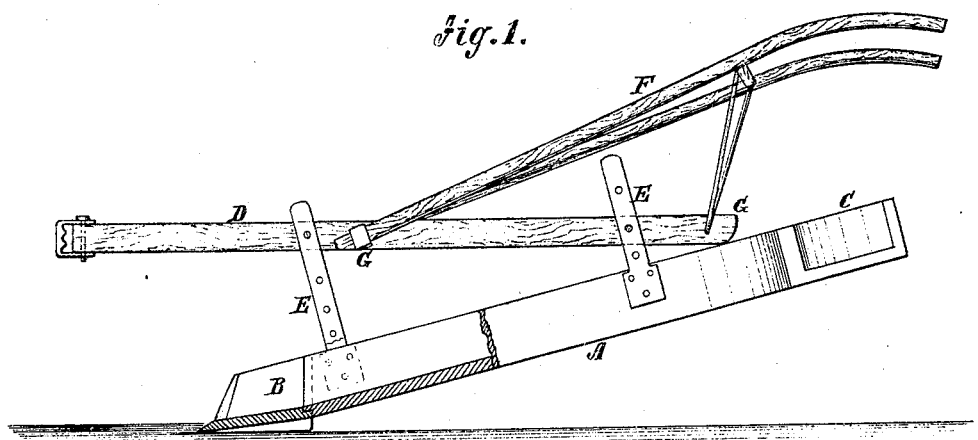
Figure 2:
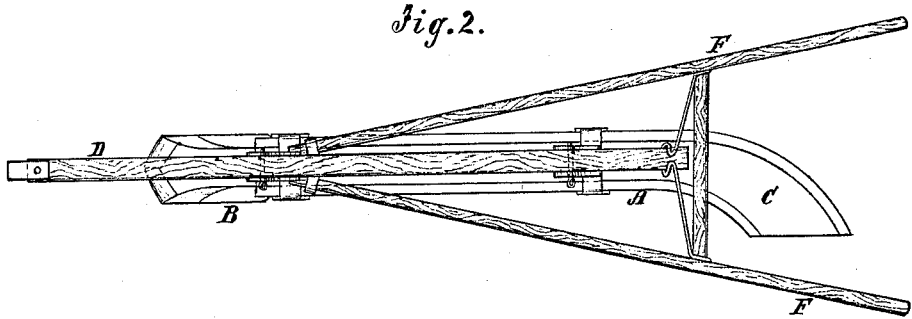

In the accompanying drawings, Figure 1 represents a sectional side elevation of the ditcher as when ready for use. Fig. 2 is a top or plan view.

Similar letters of reference indicate corresponding parts.

A is the bed-plate, which is a curved trough, as indicated in the drawings.

B is the forward angular front portion of the trough or the cutting-edge, the bottom of which is at such angle when parallel with the surface of the ground (as when in use) as to elevate the rear end, so as to discharge the earth from the curved portion C onto the surface of the ground at the side of the ditch.

D is the beam.

E E are straps or bars of iron on the sides of the bed-plate, between which the beam is supported. By means of pins and a series of holes in these upright bars the beam is made adjustable as to height, to suit the depth of the ditch.

F represents the handles, which are attached to the beam, as seen at G G. The cutting-edge or share B has on its under side guide-ribs. Its bottom stands at an angle of about fifteen degrees with the bottom of the trough, and the share is attached to the bed-plate by means of bolts or rivets. The form of its extreme cutting-edge is seen in Fig. 2. The earth raised by the share will be forced back in the trough as the ditcher moves forward, and be discharged at the side of the ditch, as before stated.

The bed-plate or trough may be made of boiler-iron or of steel, so that its interior will wear smooth and allow the earth to move therein with little friction.

Having thus described my invention, I claim as new and desire to secure by Letters Patent—

The curved bed-plate or trough A, with the share B, adjustable beam D, and handles F, combined and [arranged substantially as and for the purposes described.

ISAAC T. BAKER.

Witnesses:
H. DAY,
S. R. TUCKER.